Feb. 26, 1957 S. T. BREWER 2,783,307
SUPERVISORY CIRCUIT
Filed May 6, 1954
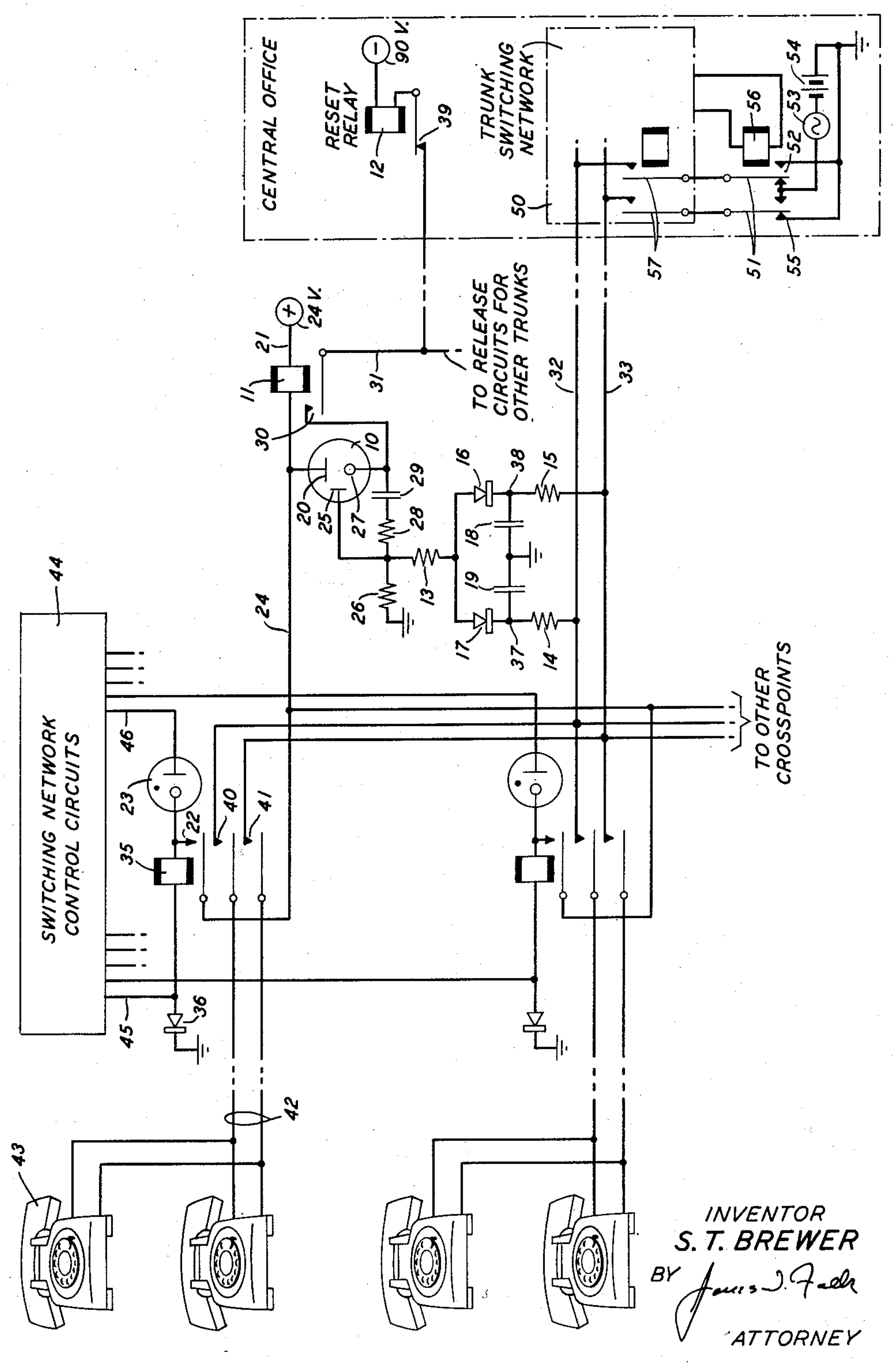
INVENTOR
S. T. BREWER
BY [signature]
ATTORNEY 2,783,307

SUPERVISORY CIRCUIT

Sherman T. Brewer, Chatham Township, Morris County, N. J., assignor to Bell Telephone Laboratories, Incorporated, New York, N. Y., a corporation of New York Application May 6, 1954, Serial No. 428,031

11 Claims. (Cl. 179—18)

This invention relates to electrical supervisory circuits and, more particularly, to such a circuit in a telephone system for supervising a connection between a subscriber line and a trunk in a remote line concentrator.

In patent application Serial No. 427,921, filed May 6, 1954, now Patent 2,724,744, issued November 22, 1955, of S. T. Brewer, W. A. Reenstra, and W. J. Ritchie, there is disclosed a telephone system wherein a number of telephone subscribers are remotely located from a central office and share a plurality of common trunks for independent connection to the central office, the number of common trunks being smaller than the number of telephone subscribers. Manifestly such an arrangement affords a greater operating efficiency and thereby provides considerable savings in the cost of operation of the telephone plant. These savings are realized by the interposition of a concentrating switch between the central office and the group of telephone subscribers. This switch, which preferably is located remote from the central office and adjacent the subscribers, advantageously is comprised of a plurality of crosspoints which are selectively operated to effect desired connections between the trunks and subscriber lines. As the central office is not directly in information communication with the subscriber lines due to the interposition of the remote line concentrator, it is generally necessary that some means be provided at the concentrator to supervise these connections and to cause their release when all central office battery voltage is removed from the trunk.

It is an object of this invention to provide an improved circuit for supervising a connection between a trunk and a subscriber line in a telephone system.

More specifically it is an object of this invention to provide an electrical release circuit in a remote line concentrator for monitoring the conductors of a concentrator trunk for the presence of voltage from the central office and to release the connection between the trunk and a subscriber line when the voltage is removed.

In a specific illustrative embodiment of the release circuit described herein, a cold cathode gas triode is provided for each trunk extending from the central office to the remote line concentrator. This tube is the main element of the release circuit and acts as both the marginal detector for supervision and the shunt down path to break the crosspoint connection. Connected to the release tube and supplying main anode voltage thereto is a trunk busy relay which is in series with the holding path of its associated crosspoints and is energized by crosspoint operation to place negative triggering voltage on the main cathode of the release tube. The release tube has its starter anode connected to the conductors of the concentrator trunk through a resistance-capacitance filter and is held from firing at this time by negative battery voltage fed over the trunk pairs from the central office. Thus during the busy condition, which includes talking, ringing, and dialing, either the tip or the ring lead of the concentrator trunk has a negative potential thereon and the connection is held. However, under the release condition all central office battery is removed from the concentrator trunk and the release tube fires to shunt down the operated crosspoint circuit and open the connection after a short delay. This delay is provided by the resistance-capacitance filter and is designed to prevent a false release of a busy connection when central office battery is removed for a short time due to ringing cut-off or transfers between silent and ringing intervals of the ringing signal. The filter through its associated diodes also acts to connect the more negative of the two trunk conductors to the starter anode of the release tube to maintain the connection during the busy condition. The release of the connection by the conduction of the release tube is followed by the operation of the reset relay which removes the main cathode voltage from the release tube and allows the tube and the trunk busy relay to return to normal.

In accordance with one feature of the release circuit, a space discharge device in circuit with the crosspoint is held from operating by a bias potential obtained from the negative battery voltage on the trunks, the removal of which causes the tube to conduct to release the crosspoint connection.

It is a further feature of this invention that the release tube shunts down the crosspoint when it conducts and releases the connection when the voltage on the tube anode reverses polarity.

It is still a further feature of this invention that a diode rectifier circuit be connected between the trunk conductors and the release tube circuit so as always to connect the more negative of the conductors to the starter anode of the tube to maintain the connection during the busy condition.

It is still a further feature of this invention that the diode rectifier circuit in the release circuit provides a high attentuation to alternating current control signals on the trunks to prevent interference in the speech range.

These, and other features, objects and advantages of the invention will be apparent from the following description and the accompanying drawing which shows a preferred illustrative embodiment of a release circuit in accordance with the present invention.

Referring now to the drawing, each release circuit comprises a gaseous discharge release tube 10, which advantageously may be of the Western Electric 395A type, a trunk busy relay 11, a reset relay 12, and a release circuit filter which consists of resistors 14 and 15, diodes 16 and 17, and condensers 18 and 19. Each of these elements occur on a per trunk basis with the exception that there is only one reset relay per concentrator. The release tube 10 is the main element of the circuit as it acts as both a marginal detector for supervision and a shunt down path for the crosspoint. The main anode 20 of the release tube 10 is connected to a source of positive potential through the winding of the trunk busy relay 11 and the lead 21. Anode 20 is also connected by the lead 24 to the relay contacts 22 of each of the crosspoints through which the trunk may be connected to the subscriber lines, such as that defined by the gas tube 23 and the electromagnetic relay 35. The starter anode 25 of the release tube 10 is connected to ground through a resistor 26, to the filter circuit through a resistor 13 and to the release tube cathode 27 through a resistor 28 and a condenser 29. The release tube cathode is connected through the contacts 30 of a trunk busy relay 11 and a lead 31 to the normally closed contacts 39 of a reset relay 12 which advantageously is located in the central office. The contacts 39 are connected to one end of the winding of the reset relay 12, the other end of which is connected to a source of a negative potential of 90 volts. One lead 32 of the concentrator trunk is connected to the release circuit resistor 13, by the series combination of resistor 14 and diode 17, while the other lead 33 of the trunk is connected to resistor 13 by the series combination of resistor 15 and diode 16. The midpoints 37 and 38 of each of the above series combination are connected to ground through condensers 19 and 18, respectively.

The trunk conductors 32 and 33 are connected at the concentrator end to the crosspoint contacts 40 and 41 of each of the subscriber lines 42 and may be selectively connected to any of the subsets 43 through the energization of the crosspoint relays 35 under the control of switching and control network 44. Each of the subscriber lines 42 may be a multiparty line with a plurality of subscriber subsets 43 connected thereto, as shown. As explained more fully in the above-mentioned Brewer-Reenstra-Ritchie patent the individual crosspoints are operated by the selective application of marking potentials on the control circuits of the concentrator in response to signals from the central office to place potentials on the leads 45 and 46 of the desired crosspoint circuit. This causes the crosspoint diode 23 to conduct and energizes the relay 35 to close contacts 22, 40 and 41 to effect a connection between a chosen trunk and a chosen subscriber line 42. The holding circuit for the relay 35 is comprised of the positive 24 volt potential source, the lead 21, the winding of relay 11, the lead 24, the hold contacts 22, the winding of the crosspoint relay 35, the diode 36, and ground.

The trunk conductors 32 and 33 are connected at the central office and to the control circuits necessary to place the proper information, and control potentials thereon, shown in the drawing as the trunk switching network 50. This circuit, shown in detail in the above-mentioned Brewer-Reenstra-Ritchie application, performs the functions of placing the proper ringing potentials, talking potentials and alternating current simplex control signals on the trunk conductors 32 and 33. In some types of selective multiparty telephone systems it is necessary to reverse the polarity of the ringing on the trunk leads. Connected to the trunk leads 32 and 33 through the ringing contacts 57 are shown the armatures 51 and 52 of a double pole-double throw switch 55. Two of the contacts of switch 55 are connected to ground and the remaining two contacts are connected through an alternating current ringing potential source 53 to the negative terminal of a direct current potential source 54, the positive terminal of which is connected to ground. Under the control of the trunk switching network 50, the relay 56 is energized to apply the alternating current and negative direct current ringing potentials from the sources 53 and 64 to either one of the trunk conductors 32 and 33 depending upon which of the party line subsets is to be rung.

The release circuit filter performs two functions: first, through the diodes 16 and 17, the more negative of the two trunk conductors 32 and 33 is connected to the starter anode 25 of the release tube 10; and second, the filter prevents false releasing of the connection by ringing voltage, the alternating current simplex voltage, or short period removals of the battery in the central office. The trunk busy relay 11 also functions to supply the main cathode voltage to the release tube 10 only when the trunk is busy and the contacts 30 are in their closed position. This prevents constant triggering of the releasing tube 10 when the trunk is idle. The reset relay 12 in the central office functions to reset or put out the release tube 10 after the shunt down interval.

The series of events between connection and disconnection will now be described. First, the crosspoint 23 is operated and relay 35 energized by the application of line and trunk marks to the switching network control circuits 44 which places a potential sufficient to cause the diode 23 to break down on the leads 45 and 46. After this potential is removed the crosspoint relay 35 is held operated by the positive voltage potential supplied through the lead 21, the winding of the trunk busy relay 11, the lead 24, and the hold contacts 22 of the crosspoint relay, the circuit being completed to ground through the diode 36. The closing of the circuit causes the trunk busy relay 11 to operate. A negative 90 volt triggering potential is then supplied to the main cathode 27 of the release tube 10 through the trunk busy relay contacts 30, lead 31 and the reset relay 12. The release tube 10 is prevented from firing at this time due to the action of condenser 29 and resistor 28 which couple the starter anode 25 to the main cathode 27. The negative main cathode voltage passing through this coupling holds the starter anode 25 sufficiently negative to avoid firing of the start gap while negative battery voltage being applied by the trunk switching network 50 at the central office is becoming stabilized on the concentrator trunk and in the filter circuit. From this time until the negative trunk battery voltage is removed, the relay circuit stays in its primed condition, i. e., with the main gap trunk voltage applied and the starter anode 25 too negatively biased to fire the starter gap.

Removal of the negative battery voltage from the trunk at the central office causes the starter anode 25 to approach ground potential because of resistor 26, thus causing the starter gap to fire. The discharge then transfers from the starter gap to the main gap in accordance with the characteristics of gas triodes. As the voltage normally applied to the release tube 10 in the nonconductive state is a positive potential of approximately 6 volts on the main anode 20 and negative potential of 90 volts on the cathode 27, the main anode 20 is drawn from the positive 6 volts level to a voltage in the range of minus 2 to minus 18 volts, the exact value depending upon the sustain voltage of the particular release tube employed. Thus the voltage on the main anode 20, and similarly across the crosspoint relay coil 35 connected to the main anode, reverses in polarity. However, as the current through the coil 35 passes through zero, the holding contacts 22 of the crosspoint open, interrupting the holding path and releasing the crosspoint. At the time the crosspoint is thus shunted down, the current through the release tube 10 also passes through the normally closed contacts 39 and the winding of the reset relay 12 in the central office. This relay in the illustrative embodiment described herein, is slow acting and operates after a delay to remove the negative 90 volts from the main cathode 27 of the release tube. This allows the release tube 10 and the trunk busy relay 11 to return to normal. Having broken its own operating path, the reset relay 12 releases and the complete circuit is again in the idle condition.

The resistance-capacitance filter between the resistance 13 and the concentrator trunk leads 32 and 33 provides a high attenuation to the alternating current simplex voltages on the trunks, while passing the direct current supervisory voltage with little loss. In the absence of these filters full level simplex voltages would appear on the diodes 16 and 17 and drive them back and forth between the conducting and nonconducting states. As the bias potentials on these two diodes are different these transitions would occur at different times, spoil the conjugacy between the signaling and the talking path and permit some of the alternating current simplex signal to spill into the speech circuit. Also the discontinuity in the conduction of the diodes would produce additional harmonics of the simplex signal which would increase its interfering effect since more energy would appear in the speech range.

As long as the peak alternating current voltage at the midpoints 37 and 38 is less than the direct current voltage difference between either of these points and the anode 25, i. e., the swing is less than the direct current voltage across the diodes and resistor 13, the diodes 16 and 17 will conduct or fail to conduct without interruption from the alternating current simplex voltage over the entire cycle of this signal. Thus, the release circuit behaves in a linear manner, the conjugacy of signaling and talking paths is preserved and no noise is introduced in the speech circuit.

Thus there has been shown and described a specific illustrative embodiment of a release circuit for a remote line concentrator telephone system which employs a space discharge device to supervise a connection between a concentrator trunk and a subscriber line and to effect its release upon removal of central office battery from the trunk. It is to be understood that the above-described arrangements are but illustrative of the application of the principles of this invention and that numerous other arrangements may be made by those skilled in the art without departing from the spirit and scope of this invention.

What is claimed is:

1. A release circuit for supervising a connection in a telephone system comprising crosspoint switch means, a trunk comprising a pair of conductors connected to said switch means, means to provide a conversation path by energizing the crosspoint switch means, means to place a negative potential on at least one conductor of said trunk when said crosspoint switch means is energized, a discharge device having a cathode, a main anode, and a starter anode, the main anode being connected to said crosspoint switch means, means controlled by the energization of said crosspoint switch means to apply a priming potential to said main cathode, filter means connected between said trunk and said space discharge device to apply a negative potential from said trunk to said starter anode to hold said space discharge device from operating while the negative potential is on said trunk, and means responsive to the removal of the negative potential from said trunk to cause said space discharge device to conduct and open the crosspoint switch means thereby releasing the connection.

2. A release circuit in accordance with claim 1 wherein said filter means comprises a resistance connected to said space discharge device, a first unidirectional impedance means connected between said resistance and one of said conductors, and a second unidirectional impedance means connected between said resistance and the other of said conductors whereby a negative potential on either of said conductors is applied to said space discharge device.

3. A monitoring circuit for supervising a connection between a subscriber line and a trunk in a remote line concentrator comprising a plurality of subscriber lines, crosspoint switch means including a relay for providing a conversation path between a subscriber line and a trunk when operated, a space discharge device having a cathode, a main anode and a starter anode connected to said crosspoint switch means, a first potential source connected to the main anode of said space discharge device, a trunk busy relay energized by the operation of the crosspoint switch means in circuit with said first potential source and said crosspoint switch means, a second potential source, means controlled by the energization of said trunk busy relay to apply a priming voltage from said second potential source to the cathode of said space discharge device, a trunk comprising a pair of conductors, means to apply a negative potential to at least one of said conductors during the busy condition, filter means connected between said trunk and the release tube to apply said negative potential to the starter anode of said release tube to prevent the tube from conducting while in the primed condition and responsive to the removal of the negative potential from the trunk to cause said tube to conduct and open the crosspoint, thereby releasing the connection between the trunk and the line.

4. A release circuit in accordance with claim 3 wherein said filter means comprises a first resistance connected to said space discharge device, a pair of diodes connected to said first resistance, a first condenser connected between one of said diodes and ground, a second condenser connected between the other of said diodes and ground, a second resistance connected between one of said diodes and one of said conductors and a third resistance connected between the other of said diodes and the other of said conductors.

5. A release circuit for supervising a connection in a telephone system comprising a plurality of subscriber lines, a trunk comprising a pair of wires, switch means including a relay for providing conversation paths between said subscriber lines and said trunk, means connected to the switch means for providing holding current for said relay when said switch means is operated, a normally nonconductive space discharge device connected between said switch means and said means for providing holding current, means controlled by the operation of said switch means for applying a priming potential to said discharge device when said switch means is operated, means for applying a negative potential to said discharge device from said trunk when busy to prevent said discharge device from conducting and for removing said negative potential from said discharge device upon completion of the call to permit said discharge device to conduct and release said switch means and reset means energized by the conduction of said discharge device for removing said priming potential and restoring said discharge device to its nonconductive state.

6. A release circuit for supervising a connection in a telephone system comprising a plurality of subscriber lines, a trunk having a pair of wires, a crosspoint switch for completing conversation paths between said trunk and subscriber lines, a normally nonconductive gaseous discharge device connected between said trunk and said crosspoint switch, a trunk busy relay connected to said switch to apply holding potential thereto when said switch is operated, means controlled by said trunk busy relay to apply priming potential to said gaseous discharge device when said switch is operated, means connected to said trunk to apply negative potential therefrom to said discharge device to prevent conduction when said trunk is busy and for removing the negative potential from said discharge device to permit conduction when said trunk becomes idle, and means for opening said crosspoint switch and releasing the connection upon conduction of said discharge device to thereby restore the release circuit to its idle condition.

7. An electrical release circuit comprising an electromagnetic relay having a coil and at least one pair of normally open contacts, a source of holding potential, a conductor connected between said source and one of said pair of contacts, the other of said pair being connected to the relay coil, means to energize the relay and close the contacts whereby the holding potential maintains the relay in the energized condition, a space discharge device connected to said conductor in shunt with said relay, means to bias said discharge device to a nonconductive state and to remove said bias to cause said discharge device to conduct whereby the relay is de-energized and the contacts return to their normally open condition.

8. A release circuit for supervising and releasing a connection in a telephone system comprising a trunk having a pair of conductors, a subscriber line, means connected to said trunk and subscriber line to effect a connection therebetween said means comprising a relay having a plurality of contacts, a source of potential connected to said relay to energize the relay and maintain the connection, a normally nonconductive space discharge device connected in shunt with said relay and means connected to said trunk to cause said discharge device to conduct and de-energize the relay, whereby the connection is released.

9. A release circuit in accordance with claim 8 wherein said last recited means comprises a pair of coupling circuits connected between said pair of conductors and the space discharge device and means to apply a bias potential to at least one of said conductors to maintain said discharge device in a nonconductive state and to remove said potential to cause said discharge device to conduct.

10. A release circuit in accordance with claim 9 wherein each of said pair of coupling circuits comprises a resistance connected in series with a unidirectional impedance.

11. In a release circuit for supervising a connection in a communication system, a control circuit comprising a space discharge device having at least a cathode, a main anode, and a starter anode, a source of positive potential, means connected to said discharge device to apply said positive potential to said main anode, a first source of negative potential, means connected to said discharge device to apply said negative potential to said cathode to place the discharge device in a primed condition, a second source of negative potential, a pair of conductors connected to said second source, one of said conductors normally being more negative than the other, and a filter comprising a pair of series connected diode resistor circuits, each circuit connecting one conductor to the starter anode of said discharge device, the diodes being poled so that the more negative of the two conductors is always coupled to the starter anode to maintain the space discharge device in a biased nonconducting condition.

No references cited.